United States Patent [19]

Kincheloe

[11] 4,417,942

[45] Nov. 29, 1983

[54] TAPE SPLICING BLOCKS

[75] Inventor: David Kincheloe, Upton, Mass.

[73] Assignee: King Instrument Corporation, Westboro, Mass.

[21] Appl. No.: 305,700

[22] Filed: Sep. 25, 1981

[51] Int. Cl.³ .................. B31F 5/06; B65H 21/00
[52] U.S. Cl. ............................ 156/502; 156/159;
       156/505; 242/58.4; 242/67.3 R
[58] Field of Search ............ 156/502, 505, 506, 304.3,
       156/159; 242/56 R, 58.4, 67.3 R

[56] References Cited

U.S. PATENT DOCUMENTS

3,693,900  9/1972  Bohn .................................. 156/506
4,062,719  12/1977  Masuzima et al. .................. 156/506
4,204,898  5/1980  King .................................. 156/505

Primary Examiner—Michael G. Wityshyn
Attorney, Agent, or Firm—Schiller & Pandiscio

[57] ABSTRACT

A splicing block for use in splicing tapes and the like comprises a rotating block in which a plurality of moveable tape guideways are disposed equidistant from and parallel to a shaft which is similarly positioned with regard to a fixed tape guideway. Rotation about the shaft, limited by a pair of fixed stops, alternately positions each of the movable guideways opposite the fixed guideway.

6 Claims, 6 Drawing Figures

TAPE SPLICING BLOCKS

BACKGROUND OF THE INVENTION

This invention relates to tape winding machines in general and more particularly to a novel type of splicing block for use in aligning the various pairs of tape to be spliced.

Machines used to transfer magnetic recording tape used in video or audio applications from the large supply reels prepared during manufacture and winding the tape on smaller reels or hubs, such as those commonly employed in tape cassettes and cartridges are well known in the art. See, for example, U.S. Pat. Nos. 4,061,286, 3,753,834, 3,637,153, 3,997,123, and 4,204,898. The typical procedure is to start with first and second hubs connected by a leader tape, sever the leader tape and splice virgin or prerecorded magnetic tape to the leader tape attached to the first hub, wind a given amount of magnetic tape onto that hub, splice the trailing end of the magnetic tape to the leader on the second hub and then mount the two hubs in a cassette housing. Alternatively, the winding procedure may be conducted while the hubs are already mounted in the cassette.

The splicing operation is automated through the use of a plurality of splicing blocks which may be moved relative to each other in order to bring selected tape ends into abutting relationship. As disclosed in U.S. Pat. No. 3,753,835 for example, a pair of moveable splicing blocks, each having a tape guideway, are alternately brought into juxtaposition with a fixed splicing block having a similar guideway. In an alternative arrangement, illustrated in U.S. Pat. No. 4,061,286, a single linearly reciprocating splicing block having two tape guideways—one for each of a pair of tapes—on reciprocating alternately aligns the guideways with a guideway on a fixed splicing block.

In loading cassettes with either device, an end of a supply of virgin or prerecorded tape is positioned on one of the moveable tape guideways, and held there (e.g., by a vacuum hold down or similar mechanism). The other moveable guideway is aligned with the fixed guideway, and the leader connected between the pair of hubs in the cassette is secured across the pair of aligned guideways (again, for instance, by a vacuum). A cut is made across the leader between the pair of aligned guideways, and, while the leader is still being held to the two guideways, the moveable guideways are shifted so as to align the end of the supply tape with the end of the leader at the fixed guideway. A splice may now be made between this piece of leader and the supply tape, the vacuum of the two now aligned guideways released, and the leader and the supply tape wound to the hub. After the desired amount of tape has been wound, the winding action is stopped, and the vacuum is again applied to the pair of aligned guideways so as to secure the supply tape. The supply tape is now severed between these two guideways and the moveable guideways are again shifted back to their original position, bringing the portion of leader affixed to the second hub into alignment with the trailing edge of the magnetic tape just supplied to the first. A splice is now made between the trailing edge of the supply tape and the leading edge of the leader. The vacuum hold down of the two aligned guideways is now released, and the winding operation is completed. A new leader may now be brought into alignment with the aligned pair of guideways and the operation repeated.

These prior art mechanisms, while satisfactory, are mechanically complex. Those designs in which two independent splicing blocks are alternately brought into alignment with a stationary block require, in addition to the plurality of mechanisms, precise synchronization and alignment. In those systems in which a single reciprocating splicing block contains a plurality of guideways, precise alignment of the ways supporting the movable block is required in order to insure proper operation and avoid unnecessary wear. Either of these prior art devices accordingly require care in assembly and maintenance. Additionally, the arrangement having two movable splicing blocks and a stationary splicing block is slower in operation than the one having a single reciprocating block.

Accordingly, it is an object of the present invention to provide a mechanism to align two or more tape paths to a stationary tape path which both has few moving parts and requires little or no adjustment or alignment, and which consequently is simple to manufacture and assemble. It is a further object of the present invention to provide such a mechanism which requires minimum maintenance and yet will suffer little bearing wear.

BRIEF DESCRIPTION OF THE INVENTION

These and other objects are met in the present invention of a rotating shift block in which the moveable tape stations are equidistant from and parallel to a shaft which is similarly positioned with regard to the fixed tape station. Rotation about this shaft, limited by a pair of fixed stops, alternately positions each of the movable stations opposite the fixed station. In a preferred embodiment, the motion of the rotating shift block is delimited by the shape and dimensions of the block and the block's disposition relative to a fixed member, such as the front panel of the machine.

It will be recognized that the structure of the rotating shift block mechanism is both simple and easy to assemble, alignment being assured by its method of manufacture. Further, as there are few moving parts and only a simple rotational motion of the shift block, maintenance is minimized. Additionally, as only the periphery of the shift block need be moved through a distance somewhat in excess of the width of a tape (rather than the entire shift block, as occurs in a linearly reciprocating shift block), less work is required to cycle the shift block. Consequently, a smaller actuator may be used for a given cycle rate. Quieter operation may also be achieved because of the smaller forces required.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the present invention reference should be had to the following detailed description taken in connection with the accompanying drawings wherein.

In the various views, like numbers refer to like members.

DETAILED DESCRIPTION OF THE DRAWINGS

Figure 1:
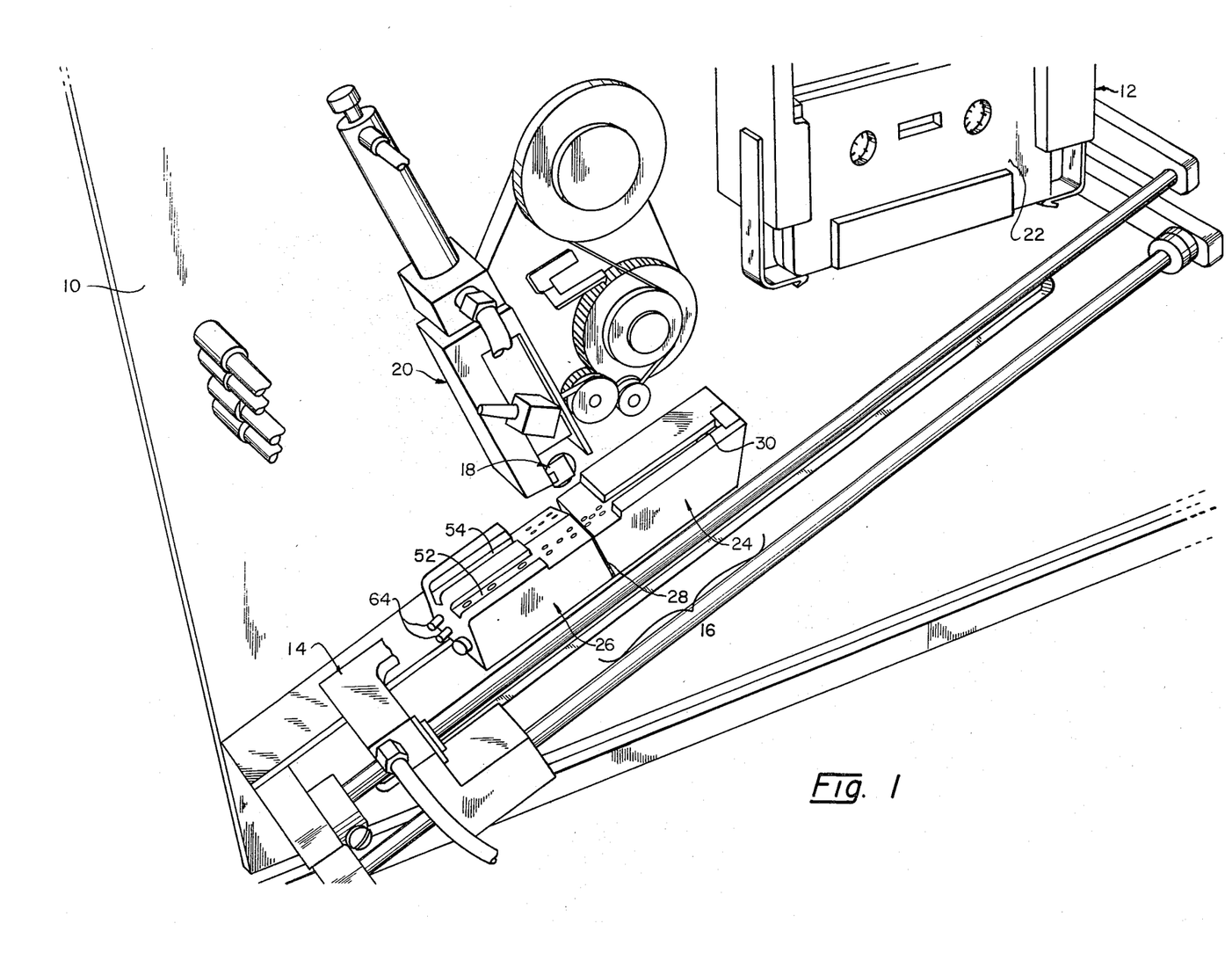
FIG. 1 is a perspective view, from the front, of a portion of a cassette loading machine as disclosed in U.S. Pat. No. 4,061,286 modified to include the improvements provided by the present invention.

Referring now to FIG. 1, a portion of a tape winding machine configured to load cassettes is shown with the splicing block assembly which comprises the preferred form of the present invention. Such a machine includes a face plate 10 which serves as a support for a number of means including cassette loading station 12, leader extraction mechanism 14 (shown only in part), splicing block assembly 16, knife mechanism 18, and splicing tape dispenser-applicator 20. Also included in a tape winding machine, but not illustrated, are tape and cassette supply means, a retractable drive spindle which may engage one of the hubs of a cassette 22 located at cassette loading station 12, and associated counting and control equipment. With the exception of splicing block assembly 16, the entire apparatus may be substantially the same as the corresponding mechanisms disclosed in U.S. Pat. Nos. 4,061,286 and 3,997,123. Accordingly, cassette loading station 12, leader extraction mechanism 14, knife mechanism 18, and splicing tape dispenser-applicator 20 are described hereinafter only to the extent believed necessary to understand and appreciate the present invention.

Figure 4:
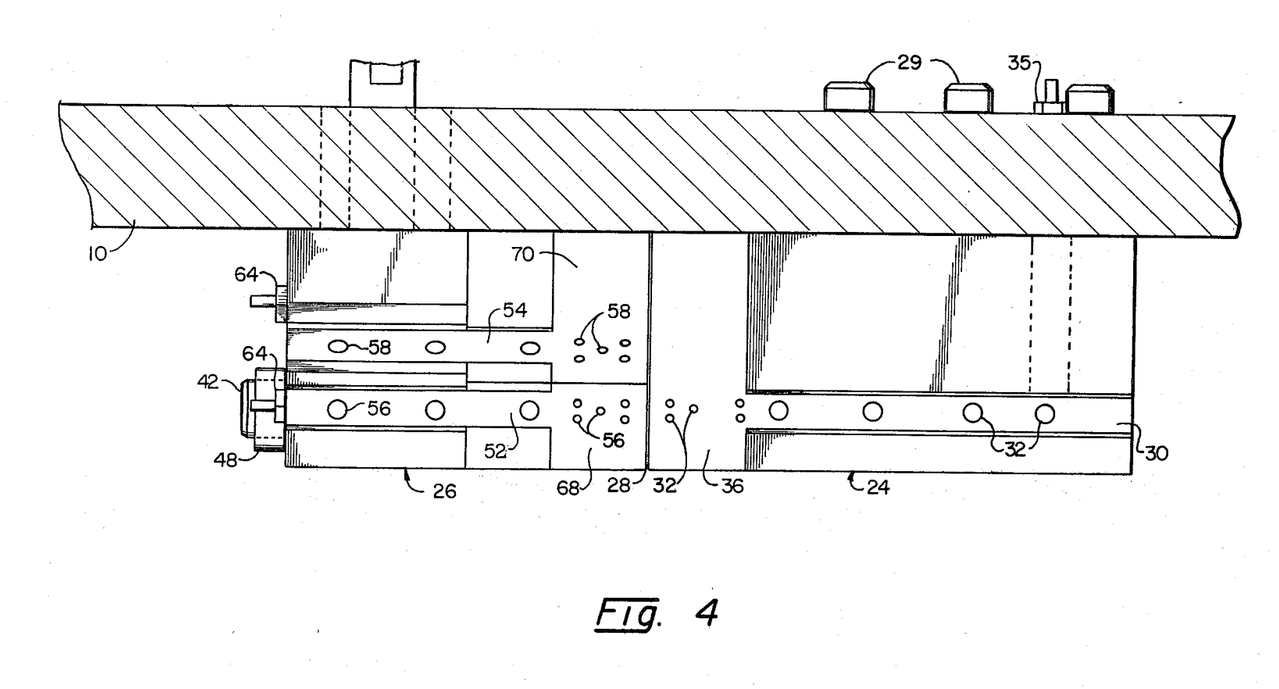
FIGS. 4 and 5 are plan views, from above, of the moveable and fixed splicing blocks with the former in the two limit positions of FIGS. 2 and 3.
Figure 5:
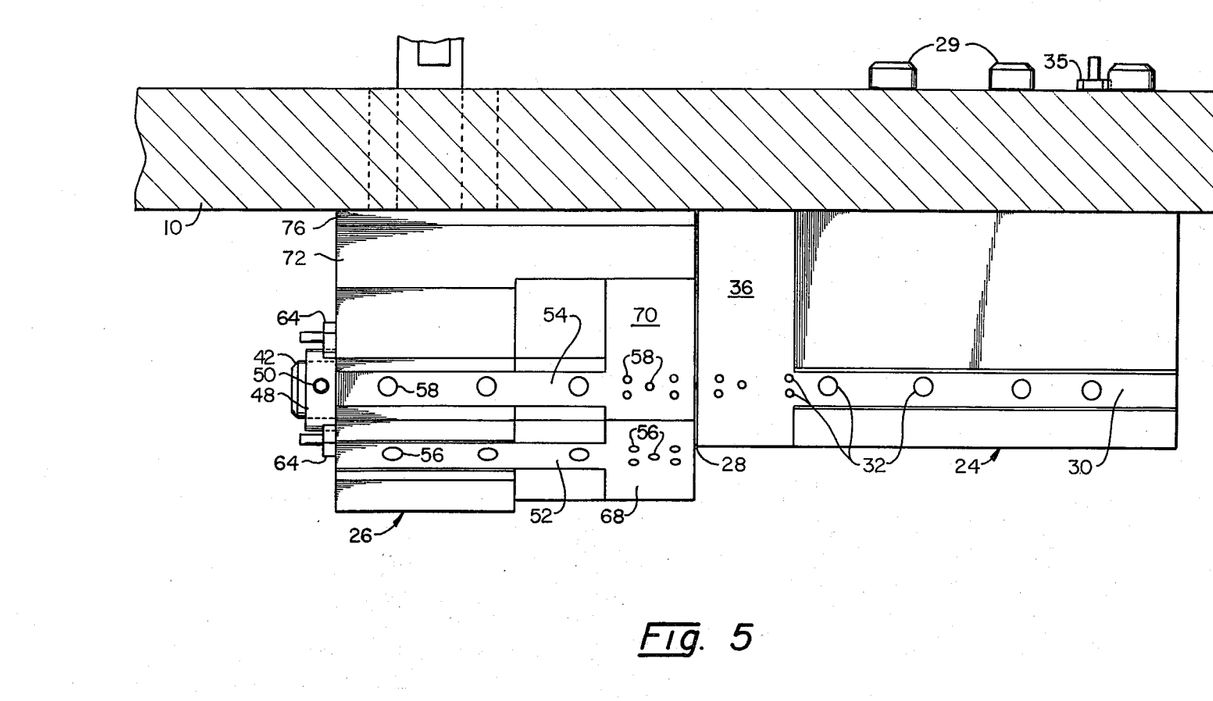

In greater detail, best seen in FIGS. 4 and 5, splicing block assembly 16 comprises a stationary splicing block 24 affixed to face plate 10 and a moveable splicing block 26. A small gap 28 separates the two blocks. Stationary splicing block 24 is preferably in the form of a rectangular solid, one face of which is secured flush to face plate 10, as by bolts 29. Stationary splicing block 24 has a flat upper surface in which is formed a single groove 30, disposed so as to run substantially parallel to face plate 10 and having a flat bottom substantially normal to the face plate. Groove 30 serves as a tape guideway and is accordingly dimmensioned to have a width equal to that of the tape to be accommodated. Groove 30 is provided with a plurality of apertures 32 which are connected via an interior passageway 34 (FIG. 6) to a hose fitting 35 (FIGS. 4 and 5) which projects through the rear of face plate 10. By this means, apertures 32 may be connected through passageway 34 through a hose and valve (not shown) to a suitable vacuum source (also not shown) so that a suction can be established through apertures 32 which will hold a tape flat against the bottom surface of groove 30.

The top surface of stationary splicing block 24 is recessed somewhat in the area adjacent to gap 28 so as to form a level platform 36 substantially planar with the flat bottom of groove 30. Apertures 32 also penetrate platform 36 in line with groove 30 and communicate with passageway 34. As may be seen in FIG. 6, stationary splicing block 24 is also provided with a bore 40 which passes longitudinally through the block. The axis of bore 40 is parallel to the longitudinal axis of groove 30 and is spaced apart from face plate 10 the same distance as is the groove.

Figure 6:
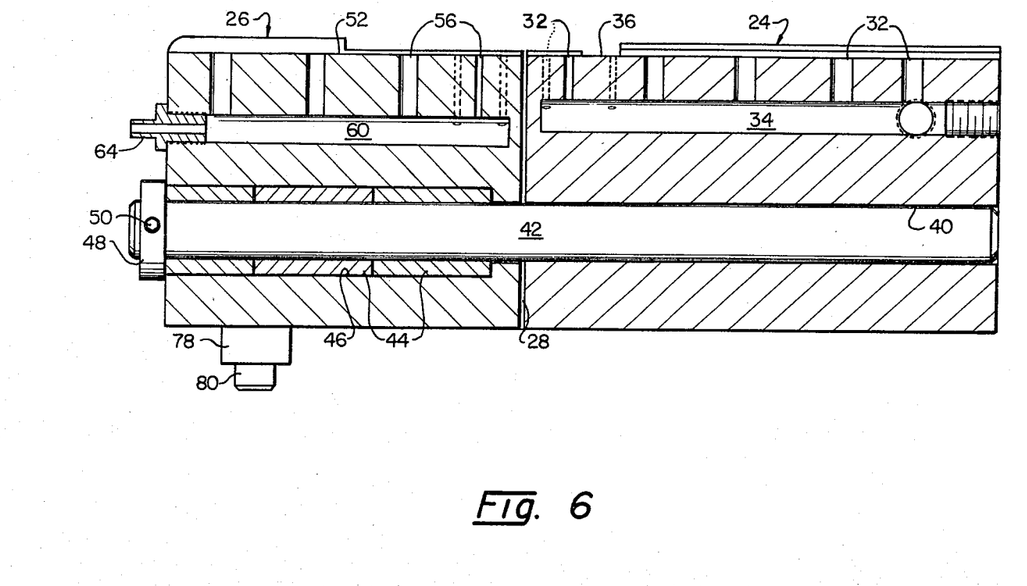
FIG. 6 is a cross-sectional view of the moveable and stationary splicing blocks taken along the line 6—6 of FIG. 2.

Shaft 42 is disposed in bore 40, as by a force fit, so as to extend from the bore on the end of stationary splicing block 24 that is provided with platform 36. Bushings 44 situated in bore 46 of moveable splicing block 26 rotatably support the moveable splicing block upon shaft 42. Moveable splicing block 26 is captivated to shaft 42, as by collar 48 and set screw 50.

Movable splicing block 26 is preferably of right prismatic form, the faces of the prism being disposed parallel the axis of bore 46. Moveable splicing block 26 has a multifaceted upper surface in which are formed two parallel grooves 52 and 54. Grooves 52 and 54 are similar to groove 30 and are disposed parallel to and equidistant from the axis of bore 46. Grooves 52 and 54 are further disposed with their bottom surfaces tangent to a right circular cylinder concentric with bore 46, the points of tangency corresponding to the longitudinal axes of the two grooves. Grooves 52 and 54 are respectively provided with apertures 56 and 58. Interior passageways 60 and 62 connect apertures 56 and 58 with hose fittings 64, for connection to a vacuum source (not shown) whereby suction may be provided against tapes positioned in the two grooves. Preferably, one or more of the passageways is formed by interconnecting bores, capped off by tapped-in machine screws 66, as is the case for passageway 62 shown in FIG. 2. This construction allows hose fittings 64 to be placed well clear of each other while still permitting grooves 52 and 54 to be closely spaced with adjacent parallel vacuum passageways. Adjacent gap 28, a portion of the top surface of moveable splicing block 26 is finished off in a pair of intersecting substantially planar platforms 68 and 70 respectively coplanar with the flat bottom surfaces of grooves 52 and 54.

Figure 2:
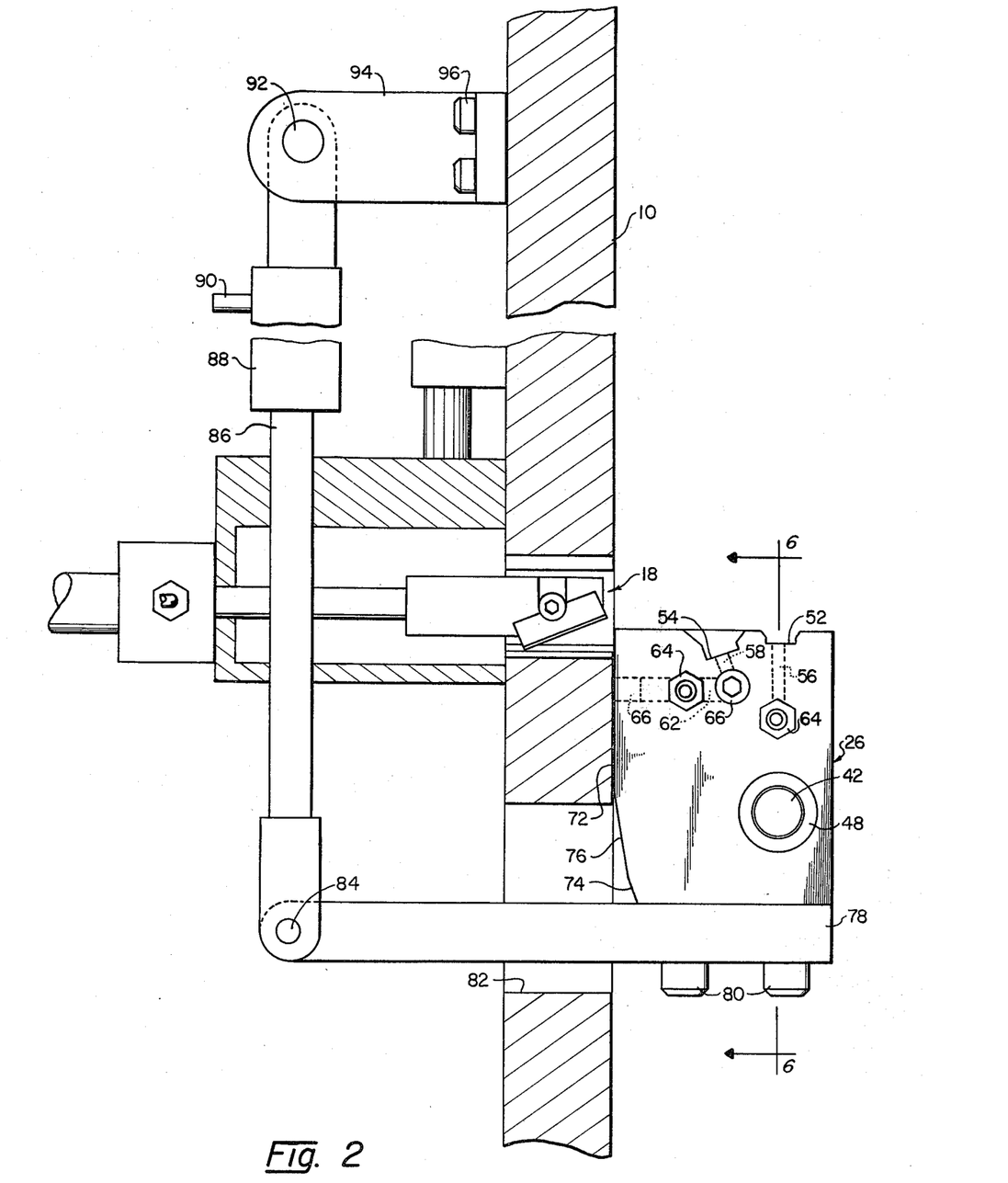
FIGS. 2 and 3 are enlarged side and cross-sectional views, respectively, of the moveable splicing block and related mechanism, showing the two limit positions of the splicing block.
Figure 3:
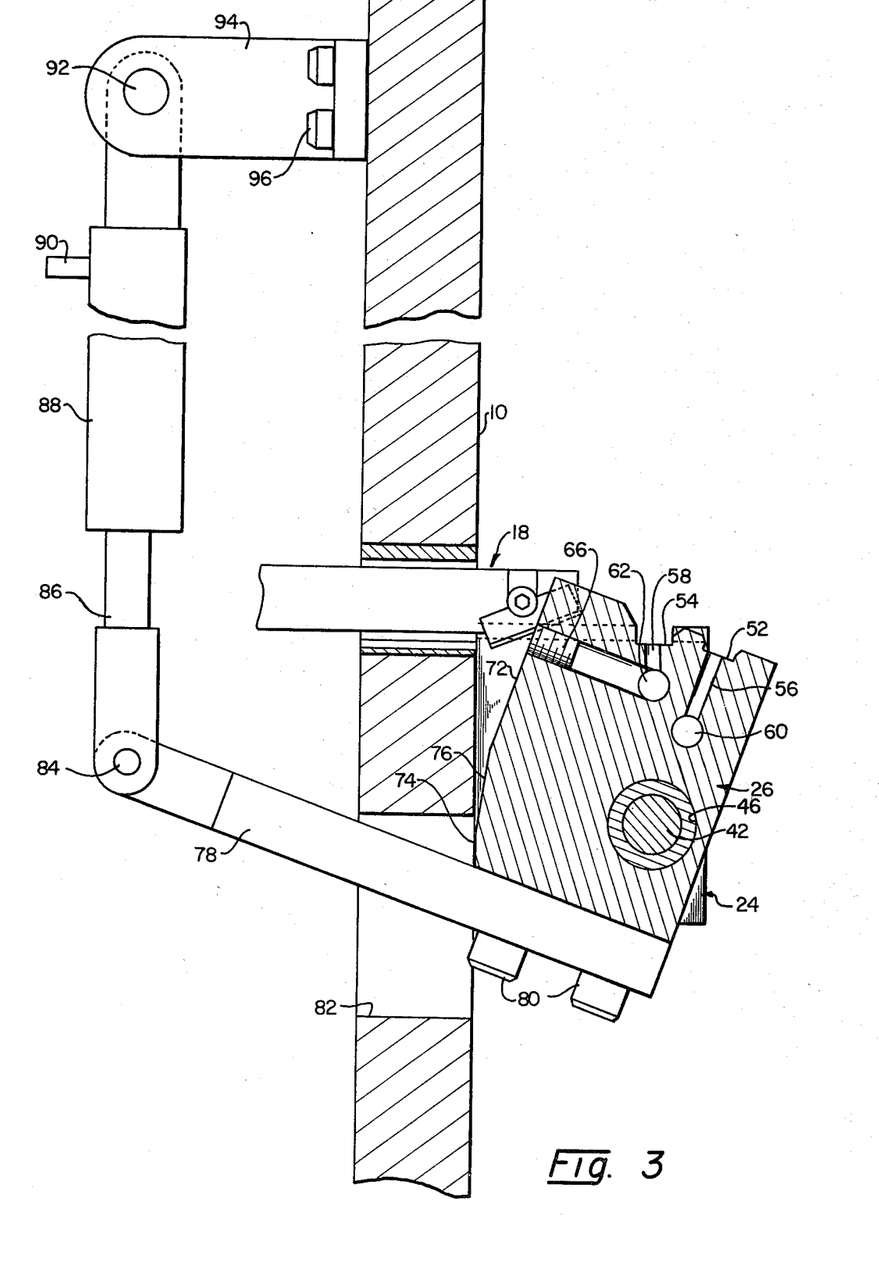

As may be seen with reference to FIGS. 2 and 3, movable splicing block 26 has a multi-faceted backface which is formed of upper backface 72, lower backface 74, and intermediate backface 76. Each of these faces is substantially planar and parallel to the axis of bore 46. Upper and lower backface 72 and 74 are respectively normal to platforms 68 and 70. Each is separated from the axis of bore 46 by a distance equal to the distance separating the axis of bore 40 in splicing block 24 from faceplate 10. Intermediate backface 76 is disposed between upper and lower backfaces 72 and 74 so as to make substantially equal angles with each. Intermediate backface 76 is further disposed to extend at least between the lines of closest approach to the axis of bore 46 of the planes of upper and lower backfaces 72 and 74.

In a preferred embodiment of the invention, platform 68 and the flat bottom of groove 52 extend at an angle of 20 degrees relative to platform 70 and the flat bottom of groove 54. Accordingly, backface 72 lies at an angle of 20 degrees relative to backface 74, and each of them makes an angle of 10 degrees with back surface 76.

Arm 78 is mounted to the bottom surface of movable splicing block 26 by a pair of bolts 80. Arm 78 extends through aperture 82 in faceplate 10 to the interior of the tape winding machine where it is pivotally connected to link 84 attached to piston rod 86 of actuator 88. Preferably actuator 88 is a single acting (spring-loaded) pneumatic actuator which may be powered by a controllable source of pressurized air (not shown) connected via a suitable control valve (also not shown) to hose fitting 90 on the upper end of the actuator's cylinder. It will be understood however that actuator 88 could be a double acting pneumatic actuator or a solenoid or other linear actuator. Actuator 88 is supported from faceplate 10 via pivot 92, bracket 94, and bolts 96. The throw of actuator 88 and the length of arm 78 are selected so as to permit actuator 88 to rotate arm 78 and the attached block 26 about shaft 42 through an angle equal to the angle between platforms 68 and 70. Bracket 94 is fixed to faceplate 10 such that when actuator 88 is fully extended (i.e., for the preferred actuator, when the upper end of the actuator's cylinder is supplied with high pressure air) upper backface 72 of movable splicing block 26 is in contact with the face plate.

In all other respects, the tape winding machine of the present invention may be similar to that described in U.S. Pat. No. 4,061,286, and, therefore, reference may be had to that publication for further details of construction which for the purpose of brevity have not been specifically described herein.

The operation of the machine will now be described. For the purposes of this description, assume that the leading edge of a blank magnetic supply tape (not shown) is disposed in groove 54 of movable splicing block 26, with its leading edge abutting gap 28. Drawing a vacuum in passageway 62 and associated apertures 58 secures the tape in this position. Spring loaded actuator 88 is normally in its extended position (i.e., high pressure air is supplied via hose fitting 90), and acting through arm 78 positions movable splicing block 26 about shaft 42 with upper backface 72 in contact with front panel 10. In this position, movable splicing block 26 is position illustrated in FIGS. 1, 2, and 4, with groove 52 aligned with groove 30 in stationary splicing block 24. The leader may now be extracted from cassette 22 by extraction mechanism 14, as described in U.S. Pat. No. 4,061,286. As described in that publication, the leader extraction mechanism disposes a length of leader along grooves 30 and 52. Drawing a vacuum in passageways 34 and 60 secures the leader in groove 30 and 52 respectively through differential pressure acting on the two faces of the tape opposite apertures 32 and 56. Knife mechanism 18 may now be extended, cutting the leader along the line of gap 28.

Releasing the pressure supplied actuator 88 via hose fitting 90 (e.g., connecting hose fitting 90 to a source of air at atmospheric pressure) now allows the spring load to bring the piston of the actuator upward, retracting piston rod 86. The resulting upward motion of arm 78 at pivot 84 produces a rotation of block 26 about shaft 42, grooves 52 and 54 rotating outward from faceplate 10 until lower backface 74 contacts the faceplate. In this position, groove 54 and the supply tape captivated therein have been brought in line with groove 30 and the portion of leader captivated therein. As described in U.S. Pat. No. 4,061,286, splicing tape dispenser-applicator 20 may now be activated, with the result that the abutting ends of supply tape and leader in grooves 54 and 30, respectively, are joined. Passageway 34 and the associated apertures 32 of stationary splicing block 24 and passageway 62 and the associated apertures 58 in groove 54 of movable splicing block 26 may now be returned to atmospheric pressure. The portion of the leader opposite groove 30 and the supply tape are now free of the splicing block and may be wound in cassette 22. When sufficient tape has been wound, or on other cue, the winding operation may be stopped and the pressure in passageways 34 and 62 may be again reduced, thereby securing the portion of supply tape opposite grooves 30 and 54 to the two splicing blocks.

Knife mechanism 18 is again momentarily extended, severing the supply tape in a line opposite gap 28. The interior of the cylinder of actuator 88 may now be pressurized once more via fitting 90. This causes the piston and attached piston rod 86 to move downward against the spring load toward the actuator's fully extended position. The downward force on pivot 84 rotates arm 78 and movable splicing block 26 about shaft 42, swinging grooves 52 and 54 inward toward faceplate 10. Movable splicing block 26 comes to rest with upper backface 72 flush against faceplate 10. In this position, groove 52 (with its captivated portion of leader) and groove 30 (with its captivated portion of supply tape) are colinear. Splicing tape dispenser-applicator 20 is again momentarily actuated, splicing together the abutting ends of the supply tape and the trailing leader. Passageway 60 and the associated apertures 56 and 58 of groove 52, and passageway 34 and apertures 32 and 38 of groove 30 are now returned to atmospheric pressure, thereby releasing the spliced-together supply tape and leader, which may now be wound into cassette 22. When the leader is fully within the cassette, a new cassette may be placed in cassette loading station 12, and the operation repeated.

The splicing block assembly of the present invention has several advantages. First, it will be recognized that in replacing either the multiple moving blocks or the linearly reciprocating single splicing block of prior art tape winding machines with a movable splicing block which rotates about a single axis, a simpler and more easily assembled mechanism results. There is no need to align a pair of parallel guideways on which a linearly reciprocating block is transported, nor further to align them with both the moving and the fixed splicing block. Inasmuch as both the motion and position of the moving block is determined by the disposition of shaft 42 and the external dimensions of the block, alignment is assured by the method of manufacture of the splicing block. Further, as there are few moving parts and only a simple rotational motion of the splicing block, maintenance is minimized. Additionally, as only the periphery of the moving block needs to be moved through the distance separating the center lines of the two tape guideways thereon, less work is required to cycle the splicing block, compared to either of the prior art splicing blocks. Consequently, a smaller actuator is required for a given cycle rate, resulting in less expensive construction and quieter operation.

It will be recognized that various changes may be made in the embodiment described without departing from the scope of the invention. Thus, for instance, shaft 42 may be permanently affixed to movable splicing block 26 and rotate in journals in fixed splicing block 24. Further, actuator 88 need not be spring loaded in the retracted position, nor spring loaded at all, nor pressure operated; any pneumatic, hydraulic, or electrical equivalent will be satisfactory. It will also be readily apparent that arm 78 can be attached in other ways and that the limit stops provided by upper and lower backfaces 72 and 74 cooperating with faceplate 10 could equally be achieved by cooperation between, for instance, the bottom of the movable block cooperating with a horizontal stop member positioned beneath the block. While for illustrative purposes the preferred embodiment has been described in connection with a machine for loading magnetic tape, it will also be recognized that the invention is not restricted to magnetic tape alone but may also be used to splice other tape-like media (e.g., motion picture film, microfilm, etc.).

Since these and other changes may be made in the above apparatus without departing from the scope of the invention herein involved, it is intended that all matter contained in the above description or shown in the accompanying drawing shall be interpreted in an illustrative and not in a limiting sense.

What is claimed is:

1. A splicing block assembly for supporting ends of a plurality of tape-like items to be spliced, said assembly comprising, in combination:

a stationary block having a first guideway for receiving one of said tape-like items;

a rotationally movable block adjacent said stationary block, said movable block having a second guideway and a third guideway for receiving a pair of said tape-like items, said movable block being rotatably supported so as to be capable of rotation on an axis parallel to and substantially equidistant from said first, second, and third guideways, said movable block having first and second prismatic faces substantially parallel to said axis;

means for rotating said movable block on said axis selectively in a first direction and a second direction; and alignment means limiting rotational motion of said movable block between a first position wherein said first and second guideways are colinear and a second position wherein said first and third guideways are colinear, said first and second positions being determined by the alternate contact of said first and second prismatic faces on said movable block with a stationary member secured to said stationary block.

2. Apparatus according to claim 1 wherein said means for rotating is a linear actuator.

3. Apparatus according to claim 2 wherein said linear actuator is pneumatically powered.

4. Apparatus according to claim 1 wherein said second and third guideways are angularly displaced from one another about said axis.

5. Apparatus according to claim 4 wherein said guideways are grooves with flat bottoms.

6. Apparatus according to claim 5 wherein said first and second prismatic faces are perpendicular to the bottoms of said second and third guideways.

* * * * *